July 25, 1972         F. E. MUELLNER ET AL         3,679,546
NUCLEAR REACTOR FUEL ROD SUPPORT GRID
Filed Oct. 22, 1968
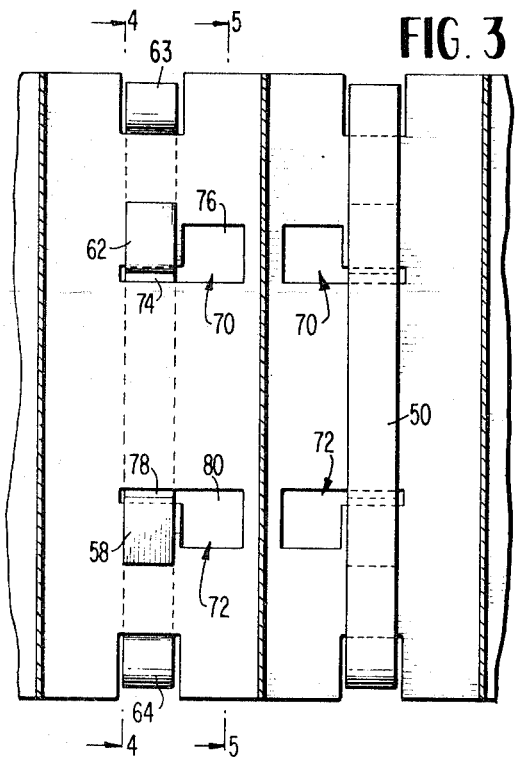
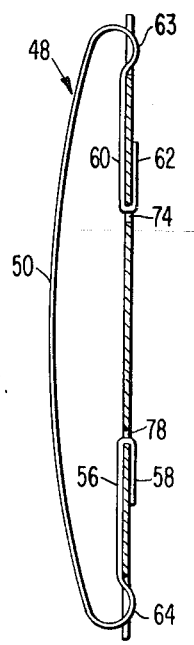
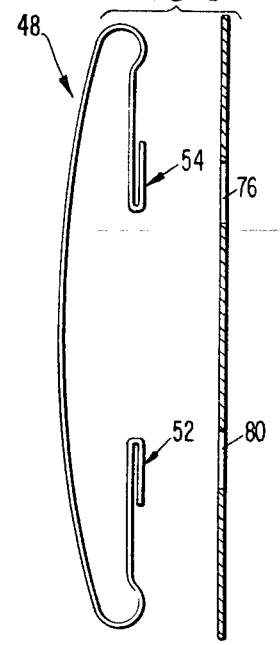
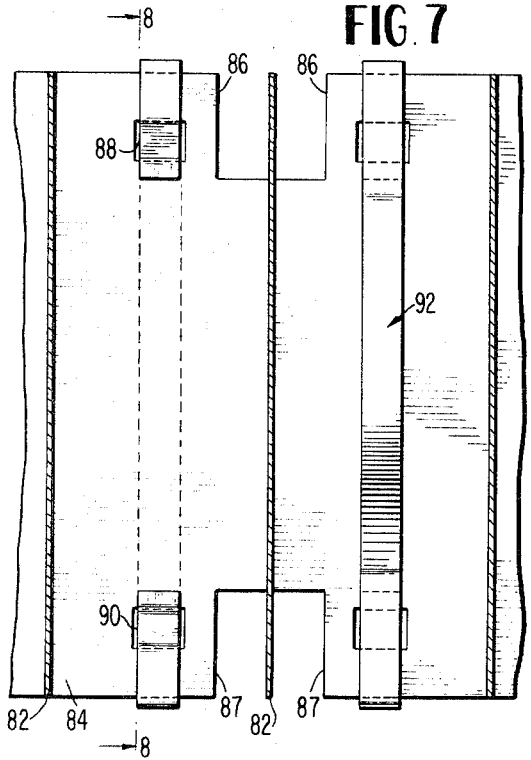
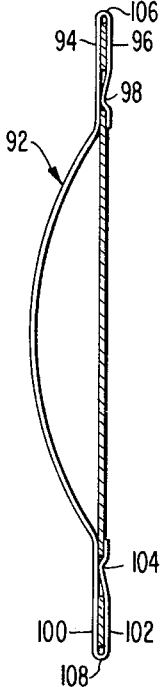
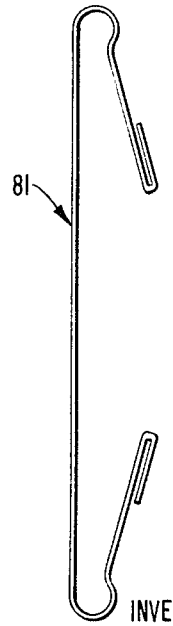
INVENTORS
FRANK E. MUELLNER
LEWIS P. SARKOZI
BY
Sughrue, Rothwell, Mion, Zinn & Macpeak
ATTORNEYS

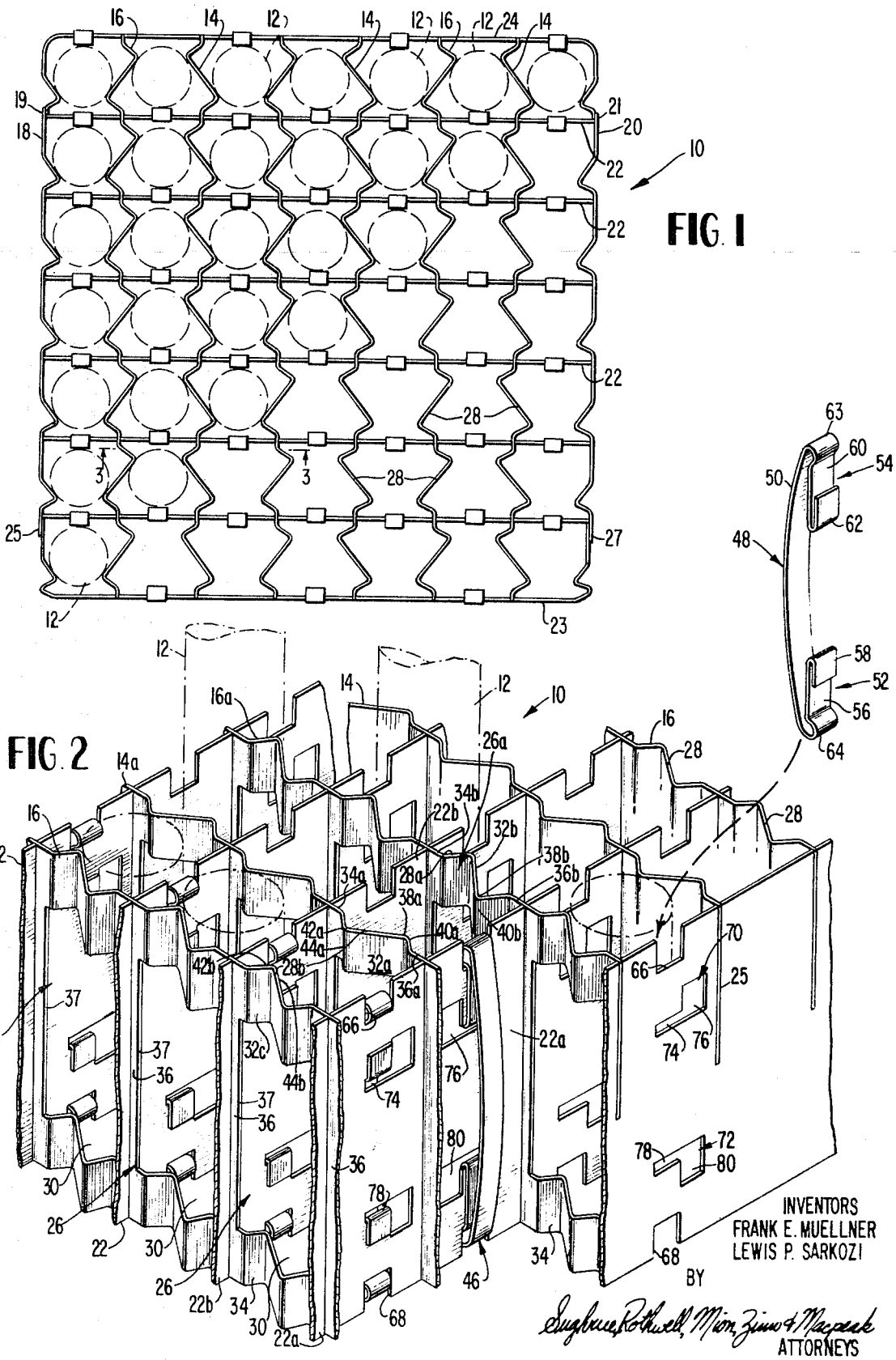

United States Patent Office 3,679,546
Patented July 25, 1972

3,679,546
NUCLEAR REACTOR FUEL ROD SUPPORT GRID
Frank E. Muellner, Potomac, and Lewis P. Sarkozi, Adamstown, Md., assignors to NUS Corporation, Washington, D.C.
Filed Oct. 22, 1968, Ser. No. 769,587
Int. Cl. G21c 3/34
U.S. Cl. 176—78                                5 Claims

ABSTRACT OF THE DISCLOSURE

A generally rectangular support grid of the egg-crate type for laterally supporting intermediate their ends the fuel rods in a nuclear reactor fuel assembly. Substantially perpendicular wall members form a plurality of openings through which nuclear reactor fuel rods are adapted to extend when mounted in a nuclear reactor fuel assembly. Two opposite walls of each opening have inwardly projecting portions which form substantially rigid support surfaces for a rod. A removable spring is mounted on a third wall of each opening for providing a resilient support surface for the rod. Therefore, three surfaces support the rod against lateral movement while providing for axial movement thereof, and the rod is supported at only three areas around any given peripheral section of the rod. The spring is shaped to cooperate with slots mounted in the third wall so that the spring may be easily installed and removed after the wall members have been permanently assembled to form the grid. Therefore, springs made of different material from that of the grid members may be used. In addition, different size springs may be mounted on the third wall of an opening to accommodate warping of the support grid and variations in the diameters of the rods. The third wall also contains means for reliably locking the spring in place during reactor operation.

BACKGROUND OF THE INVENTION

Field of the invention

The invention relates broadly to nuclear reactor fuel element assemblies and more particularly to an improved support grid for supporting fuel rods intermediate the ends thereof when the rods are mounted in a reactor fuel assembly.

Description of the prior art

Fuel rod support grids are generally known in the prior art. Typical prior art support grids are disclosed in U.S. Pats. Nos. 3,350,275 and 3,379,617, for example.

The fuel rods are generally supported at intervals intermediate their ends to maintain uniform rod-to-rod spacing, thereby minimizing local neutron and heat flux peaking and permitting the reactor to be operated more closely to its designed power limit. In the absence of such support, the rod-to-rod spacing along the length of a fuel rod assembly may vary significantly, both as a result of the conventional tolerances of fuel rods and of the fuel assembly components and also as a result of the influence of induced thermal, hydraulic, and mechanical forces acting upon the rods during operation of the nuclear reactor. Lateral support of a fuel rod intermediate its ends is also desirable, particularly for long fuel rods used in present reactor designs, to inhibit the wear which might otherwise develop at the connections at the ends of the fuel rods as the result of vibrations induced in the fuel rods by the cooling fluid which flows along and among the fuel rods.

An ideal fuel rod support grid should have all of the following desirable characteristics. The grid should maintain the desired fuel rod spacing throughout the lifetime of the fuel rod assembly without impairing the integrity of the fuel rod cladding as a result of component wear at the interface between the cladding and the support surface of the grid. In performing this function, the grid should use minimum lateral clamping loads to reduce to a minimum the axial loads tending to produce rod bow between axially spaced support surfaces.

Furthermore, the support grid should be designed to minimize the hydraulic pressure drop introduced by the support surfaces, such as by minimizing the number of support surfaces interfering with the coolant flow, minimizing the cross-sectional area of all support surfaces in the flow path, and minimizing the dimension of the grid in the direction of flow, or alternatively the support grid should include means for improving the mixing of the coolant in order to improve the heat transfer between the fuel rods and coolant.

In addition, the support grid should minimize the contact area with the fuel rod cladding in order to reduce local hot spots and consequent failure of the cladding. Also, the support grid should minimize the amount of nuclear poison material present in the reactor core by reducing the volume of such material present in the grid and/or by reducing its neutron absorption cross-section.

It is also highly desirable that the support grid be designed so that it supports each rod individually so that an unanticipated failure of a support component at one support location will not cause progressive support component failures and loss of rod support at other locations. Furthermore, a support grid should be designed so that a single component failure, e.g. breakage at the point of highest stress, will not result in the failed component's dropping into the flowing coolant to cause blockage of a coolant channel.

None of the support grids of the prior art incorporated all of these desirable features. In one prior art design employing a combination of wires and straps to form the grid including separate springs mounted on the grid, the fuel rods are not individually supported since the failure of one of the wire members of the grid or of the spring results in the loss of support of as many as six fuel rods. Furthermore, the use of wire in the support grid is conducive to wear at the interface thereof with the fuel rod cladding because of the resulting point area of contact. In addition, the compressive strength of the grid frame is compromised by the use of wires instead of straps for some elements of the support grid, and such a defect is particularly unsatisfactory when the support grid also serves as a part of the structural frame of the fuel rod assembly. Another disadvantage of such a prior art type support grid is that the separate springs must be inserted in the grid before the grid is assembled, and the spring cannot thereafter be replaced without disassembling the support grid. Where the grid is assembled by welding together the grid elements, the welded joints would have to be broken to permit replacement of the spring.

In another type of prior art support grid, straps rather than wires are used to form all of the elements of the grid frame. However, the springs for providing resilient support of the rods are integral with the straps. Such an arrangement does not permit the optimum design for both the straps and the springs, since materials which have desirable spring characteristics generally also have high neutron-absorption characteristics. Conversely, materials having minimum neutron-absorption characteristics usually do not have good spring characteristics. In addition, exacting fabrication tolerances are necessary in the integral spring-type grid design to produce the desired minimal lateral support loads. Furthermore, in this type of support grid, the projected cross-sectional area of the integral springs and integral rigid support dimples is relatively large, thereby increasing the resistance to coolant flow and requiring higher pumping power so that plant efficiency is reduced.

SUMMARY OF THE INVENTION

The object of the present invention is to provide an improved fuel rod support grid which corrects the above-mentioned defects of the prior art support grids.

More specifically, the improved support grid provides individual support for each rod so that a failure of a support component will affect only one rod. Furthermore, failure of a support spring at the location of maximum stress will not cause a part of the spring to fall into the flowing coolant.

Another specific object of the invention is to provide a support grid in which the cross-sectional area of the grid is significantly less than many prior art designs because each rod is supported around a given peripheral section at only three points rather than four points. Furthermore, the grid structure is sufficiently substantial to be used in a fuel rod assembly of the type in which the stiffness of the assembly depends upon the structural integrity of the fuel rod support grids.

Another object of the invention is to provide an improved support grid in which different materials may be used for the support springs and the members forming the grid frame. Furthermore, the springs can readily be inserted or removed from the support grid prior to loading of the fuel rods therein. Such an arrangement permits the manufacturing tolerances of the grid frame to be relaxed considerably since even after the grid straps are assembled and joined, springs of different heights can be inserted in the grid, thereby maintaining the spring loads very near the minimum design values at each rod location. This feature of permitting springs to be replaced is particularly important when the grid frame is permanently joined as by a welding process in which the wall members of the support grid are distorted in various degrees as a result of the non-uniform heating and cooling of the members. An additional advantage of providing a support grid in which the springs are easily removable is that a grid containing a damaged spring or a spring of improper size or resilience can readily be repaired, thereby resulting in higher grid fabrication yields and correspondingly reduced costs.

BRIEF DESCRIPTION OF THE DRAWINGS

FIG. 1 is a schematic plan view of the improved support grid embodying the invention;

FIG. 2 is a partial perspective view of the improved support grid showing one spring removed from the grid;

FIG. 3 is a cross-sectional view taken along the line 3—3 in FIG. 1;

FIG. 4 is a cross-sectional view taken along line 4—4 in FIG. 3;

FIG. 5 is a cross-sectional view taken along line 5—5 in FIG. 3 and illustrates the manner in which a performed spring is installed in the grid;

FIG. 6 is an elevational view of a different kind of spring which may be installed in the grid;

FIG. 7 is an elevational view of another embodiment of the invention which utilizes a different type of support spring; and FIG. 8 is a cross-sectional view taken along line 8—8 in FIG. 7.

DESCRIPTION OF THE PREFERRED EMBODIMENTS

FIGS. 1 and 2 illustrate a preferred embodiment of the novel fuel rod support grid 10 through which a plurality of cylindrical fuel rods 12 are adapted to extend when mounted in a nuclear fuel assembly. The support grid is designed to be used in a fuel assembly which is well known in the prior art and is not illustrated per se. The ends of the fuel rods are supported by end-connections in the fuel assembly, and one or more fuel rod support grids 10 are positioned along the length of the assembly to provide lateral support at points intermediate the ends of the fuel rods while permitting axial movement of the fuel rods.

Support grid 10 is formed by a plurality of spaced first wall members extending substantially parallel to each other. The first wall members consist of intermediate first wall members 14 and 16, which are mirror images of each other, and end first wall members 18 and 20, which are also mirror images of each other.

A plurality of spaced, substantially parallel, second wall members are interlocked with the first wall members to form an egg-crate construction. The second wall members are substantially perpendicular to the first wall members and consist of a plurality of intermediate second wall members 22 and two end second wall members 23 and 24. The peripheral band of the grid is formed by joining end wall member 24 to end wall members 18 and 20 at points 19 and 21 respectively and end wall member 23 to members 18 and 20 at points 25 and 27, respectively.

The first and second wall members are slotted to provide the egg-crate construction. As viewed in FIG. 2, the first intermediate wall members 14 and 16 each contain a slot extending vertically upward from their lower edge one half the distance of the height of the wall member, and the second intermediate wall members 22 each contain a vertical slot, such a slot 25 extending from the upper edge thereof vertically downward one half the height of the wall member. After the first and the second wall members are interlocked to form the egg-crate assembly construction, they are permanently fixed in position as by welding them together.

The construction of the first and second wall members can best be understood by referring to FIG. 2. It can be seen that the first and second wall members together form a grid 10 of cells 26 through which fuel rods 12 are adapted to extend when the grid is placed in a nuclear fuel assembly. Each cell 26 has an upper aperture 28 and a lower aperture 30.

Each of the first intermediate wall members 14 and 16 consists of an upper strap 32 and a lower strap 34 connected by vertical extensions 36, thereby forming an opening 37 which reduces the amount of neutron-absorbing material in a grid frame. Looking at a typical cell 26a, for example, we see that the upper strap 32a of a first wall member 14a has two substantially straight strap portions 34a and 36a, and the upper strap portion 32b of wall member 16a has two substantially straight portions 34b and 36b. The straps are made of substantially rigid material. Strap 32a is deformed inwardly toward the center of aperture 28a at the point 38a, and strap 32b is deformed inwardly towards the center of aperture 28a at the point 38b.

The strap surfaces 40a and 40b form first and second substantially rigid support surfaces for a fuel rod. These support surfaces are formed so that they are positioned nearer the second wall member 22a than the second wall member 22b so that the fuel rod will be positioned substantially within the center of the aperture 28a when a resilient means, such as a leaf spring 46, is mounted on second wall member 22b as will be described in more detail below. The lower strap 34 in each cell is shaped in the same manner as the upper strap member.

Looking again at strap member 32a, we see that it is also deformed at point 42a inwardly into the adjacent aperture 28b to form a rod support surface 44a in the adjacent grid cell. In like manner, the strap 32c is deformed at point 42b to form another support surface 44b for a fuel rod extending through aperture 28b. The support surfaces 44a and 44b are formed nearer the strap 22b than the strap 22a so that a fuel rod positioned in aperture 28b will be substantially centered within the aperture when a leaf spring, such as spring 46, is mounted on the strap 22a. Consequently, it is seen that each of the upper and lower straps 32 and 34 of the intermediate first wall members 14 and 16 provides one rod support surface in each of the corresponding apertures of the two adjacent (in the direction perpendicular to the first wall members) grid cells separated by a first wall member. However, these support surfaces in adjacent cells are located nearer opposite ones of the second wall members defining the cells; and in like manner, the leaf springs for providing resilient support of fuel rods in adjacent cells are mounted on opposite ones of the second wall members defining the cells.

A resilient rod-supporting means, such as a leaf spring 48, is adapted to be mounted on the support grid 10 to extend inwardly into each of the grid cells 26. The spring consists of a flat leaf 50 and two tabs 52 and 54. Tab 52 consists of an upwardly extending flange 56 and a downwardly turned flange 58, and tab 54 consists of a downwardly extending flange 60 and an upwardly turned flange 62. The spring also has an upper curled portion 63 and a lower curled portion 64.

Each intermediate second wall member 22 has notches 66 and 68 formed in their upper and lower edges, respectively, in the center of each cell 26. As illustrated in FIG. 1, the end second wall members 23 and 24 have slots formed only in alternate cells.

The second wall members are solid straps except for the vertical slots 25 to provide for the egg-crate construction, the notches 66 and 68 and slots 70 and 72. Slot 70 has a narrow locking slot portion 74 and a wider tab entry slot portion 76, and slot 72 has a narrow locking slot portion 78 and a wider tab entry slot portion 80. When the leaf springs are locked in place prior to the loading of fuel rods into the support grid, they are positioned, as illustrated in FIG. 2 for spring 46, with the upper and lower curled portions 63 and 64 projecting through the upper and lower notches 66 and 68 to provide detents which lock the spring in place. However, the curled portions do not project through the notches far enough to interfere with the rod in the adjacent cell or to provide significant impediment to coolant flow. The tabs 52 and 54 are interlocked with the second wall members such that the flanges 56 and 60 are on one side of wall member and the flanges 58 and 62 are on the opposite sides of the wall member.

The locked position of the spring is illustrated in more detail in FIGS. 3 and 4. The spring is preformed to the shape illustrated in FIG. 5. It is contemplated that springs having different spring heights will be fabricated so that individual springs can be tailored to the assembled dimensions of individual grid cells. A spring is installed by inserting its tabs through the wide slot portions 76 and 80 of slots 70 and 72, respectively, so that the portions of the wall members adjacent to the slots are inserted between the flanges 56, 58 and 60, 62. Note that the slots 70 and 72 in adjacent grid cells are mirror images of each other. The spring is then moved along the wall member until the curled portions snap into the notches 66 and 68 and the tabs move into the narrow slot portions 74 and 78. It is important to note that the locking or detent action is increased when a fuel rod is positioned in a cell, because the rod applies to the leaf of the spring a force which urges the curled ends of the spring into the upper and lower locking notches 66 and 68.

A spring 81 having a free form as illustrated in FIG. 6 is easier to fabricate and may also be used; however, in this case the leaf of the spring is deflected toward the center of the cell to obtain the installed shape illustrated in FIG. 4 and to permit the spring to slide from the tab entry slots to the locking notches.

When it is desired to remove a spring, the ends of the spring are pulled towards the center of its corresponding cell to release the curled portions of the spring from the upper and lower notches so that the spring can move over the wall member towards the wider tab entry slot portion of the slots until the tabs are completely within the tab entry slot portions at which time the springs can be removed. However, this lateral movement of a spring is not possible when a fuel rod is inserted in the grid cell; therefore, the springs are reliably locked in position in the assembled fuel assembly containing the fuel rods.

FIGS. 7 and 8 illustrate another embodiment of the support grid utilizing a different type of spring. The first wall members 82 are identical to those illustrated in FIGS. 1 and 2, but the second wall members 84 have the configuration illustrated in FIG. 6. In this embodiment, the tab entry slots 86 and 87 are formed at the end of each cell adjacent the intersecting first wall member 82. Furthermore, formed in the wall member in the center of each cell are upper and lower spring locking slots 88 and 90 which receive the spring in locked position. In this case, the spring 82 is preformed substantially in the shape illustrated in FIG. 8 and has end tabs 106 and 108. Spring 82 has an upward extending flange 94 and a down turned flange 96 having a detent portion 98. In like manner, the bottom end of the spring has a downwardly extending flange 100 and an upturned flange 102 having a detent portion 104.

To install the spring illustrated in FIGS. 7 and 8, the tabs 106 and 108 are inserted into the upper and lower slots 86 and 87 and the spring is then moved towards the center of the cell with the wall members inserted between the flanges 94, 96 of tab 106 and flanges 100, 102 of tab 108. When the detent portions 98 and 102 reach their respective slots 88 and 90, they snap into position through the slots to lock the spring on the wall member.

All types of illustrated springs are easily removable even after the wall members of the grid are permanently welded together. The springs are removed by the opposite action described for installation of the springs. Such a feature permits obtaining the desired interference between spring and fuel rod substantially independently of the grid cell dimensions by having available springs of different spring heights to accommodate the tolerances in the as-built dimensions of the grid. Furthermore, if during the insertion of the fuel rods into a fuel assembly, a grid spring breaks or is bent, the corresponding rod may be removed, and the spring replaced.

In a typical fuel assembly in which this grid is designed to be used, the length of the fuel rods would be on the order of twelve feet and support grids would be spaced at two foot intervals between the ends of the rods. The spring and the first and second wall members of the grid would have thickness in the range of 0.015 to 0.032 inch.

In the present state of the art, the preferred material for the first and second wall members is an alloy of zirconium, and a preferred material for the springs is a precipitation-hardened nickel-base alloy. Although nickel-base material has a high capture cross-section for neutrons, the volume of spring material is small relative to the total volume of grid material. Furthermore, such material has high strength properties, thereby permitting the development of relatively large deflections without exceeding allowable stress limits, and in addition it does not suffer from the very large values of stress relaxation under neutron irradiation that have been observed in zirconium alloys. Therefore, shorter grid heights and smaller beginning-of-life lateral spring loads (and lesser axial loads tending to produce rod bow) can be used to achieve the minimum end-of-life loads which avoid wear of the fuel rod cladding. An electron beam welding process may be used to join the wall members to minimize welding distortion.

None of the foregoing descriptions of typical dimensions or materials is intended to be limiting on the invention whose scope is defined in the appended claims. While the invention has been particularly shown and described with reference to preferred embodiments thereof, it will be understood by those skilled in the art that the foregoing

We claim:

1. A nuclear reactor fuel rod support grid for supporting a plurality of fuel rods intermediate the ends thereof comprising:
   (a) a plurality of spaced first and second substantially rigid wall members assembled to form a grid having a plurality of apertures for receiving a plurality of elongated fuel rods,
   (b) said first wall members extending generally parallel to each other, and said second wall members being parallel to each other,
   (c) said first and second wall members extending perpendicular to each other and parallel to the longitudinal axes of said fuel rods when the rods are positioned in said apertures,
   (d) each aperture being defined by two opposite first wall members and by two opposite second wall members, said two opposite first wall members having inwardly extending portions which form within each aperture first and second substantially rigid support surfaces for a fuel rod,
   (e) removable resilient means mounted on said one of said second opposite wall members to form within each aperture a resilient support surface for a fuel rod, whereby a fuel rod is supported around a given peripheral section thereof by said first and second substantially rigid support surfaces and by said resilient support surface,
   (f) said one of said second opposite wall members having locking means for removably and reliably locking said resilient means in position thereon,
   (g) said resilient means comprising an elongated leaf spring having tabs on the opposite ends thereof, and said locking means comprising:
   (h) a pair of tab entry slots in opposite ends of said one of said second opposite wall members for receiving said tabs in an installation position of said spring, and
   (i) a pair of spring-locking openings in opposite ends of said one of said second opposite wall members for receiving opposite end portions of said leaf spring-locking position, whereby said spring may be removed from said one of said second opposite wall members without disassembling said support grid.

2. A fuel rod support grid as defined in claim 1 wherein said removable resilient means is made of a material different from that of said first and second wall members.

3. A fuel rod support grid as defined in claim 1 wherein:
   (a) said leaf spring comprises a leaf portion between said end portions, and
   (b) said leaf portion extends into said each aperture, whereby a fuel rod positioned in said aperture is forced against said leaf portion to urge said end portions into said spring-locking openings, thereby preventing removal of said spring.

4. A fuel rod support grid as defined in claim 3 wherein each tab entry slot has first and second slot portions, said first slot portion being larger than said second slot portion and being off-set relative to its corresponding spring-locking opening, and said second slot portion being aligned with its corresponding spring-locking opening, whereby when said leaf spring is moved from its installation position to said spring-locking opening, said spring tabs are moved from said first slot portion to said second slot portion.

5. A fuel rod support grid as defined in claim 3 wherein said spring end portions are formed on said tabs.

References Cited

UNITED STATES PATENTS

| | | | |
|---|---|---|---|
| 3,182,003 | 5/1965 | Thorp II et al. | 176—78 |
| 3,298,922 | 1/1967 | Prince et al. | 176—76 |
| 3,255,091 | 6/1966 | Frisch | 176—78 |
| 3,301,765 | 1/1967 | Eyre et al. | 176—78 |
| 3,350,275 | 10/1967 | Venier et al. | 176—78 |
| 3,379,617 | 4/1968 | Andrews et al. | 176—78 |
| 3,379,619 | 4/1968 | Andrews et al. | 176—78 |
| 3,380,890 | 4/1968 | Glandin et al. | 176—78 |
| 3,389,056 | 6/1968 | Frisch | 176—78 |
| 3,463,703 | 8/1969 | Crandall | 176—78 |

CARL D. QUARFORTH, Primary Examiner

G. SOLYST, Assistant Examiner

U.S. Cl. X.R.

176—76